United States Patent [19]

Allan

[11] 4,122,503
[45] Oct. 24, 1978

[54] POSITIONING SYSTEM AND METHOD PARTICULARLY USEFUL FOR MAGNETIC DISK DRIVES

[75] Inventor: James Clark Allan, Kinross-Shire, Scotland

[73] Assignee: Burroughs Corporation, Detroit, Mich.

[21] Appl. No.: 810,447

[22] Filed: Jun. 27, 1977

[30] Foreign Application Priority Data

Dec. 9, 1976 [GB] United Kingdom ............ 51340/76

[51] Int. Cl.$^2$ .................... G11B 21/08; G05D 23/275
[52] U.S. Cl. ...................................... 360/78; 318/634
[58] Field of Search .................... 360/78; 364/110; 318/632, 634

[56] References Cited

U.S. PATENT DOCUMENTS

| | | | |
|---|---|---|---|
| 3,579,073 | 5/1971 | Johnstone et al. | 318/634 |
| 3,672,246 | 6/1972 | Prewett et al. | 318/634 |
| 3,775,655 | 11/1973 | Du Vall | 360/78 |
| 3,900,782 | 8/1975 | Hammerschmitt | 318/634 |
| 4,056,831 | 11/1977 | Godbout et al. | 360/78 |

Primary Examiner—Robert S. Tupper
Attorney, Agent, or Firm—Kevin R. Peterson; Edward J. Feeney, Jr.; Lynn L. Augspurger

[57] ABSTRACT

Disclosed is a positioning system and method particularly useful for so-called floppy disks for positioning a device with respect to a reference on a disk in accordance with a command signal despite temperature and humidity variances.

12 Claims, 10 Drawing Figures

POSITIONING SYSTEM AND METHOD PARTICULARLY USEFUL FOR MAGNETIC DISK DRIVES

The present invention relates to a system for accurately positioning a device with respect to a reference on a body. The invention is particularly useful in a system for positioning a transducer (e.g., magnetic head) with respect to a record medium (e.g., multi-track disk), and is therefore described below with respect to such a positioning system.

The invention has particular application for use in low-cost drive systems for flexible (or "floppy") disks wherein the present state of the art permits only relatively low track densities, in the order of 48–64 tracks per inch (TPI), because of the substantial dimensional changes under varying temperature and humidity conditions. Obviously, the more accurately a head can be positioned, the higher the permissible track density before intolerable errors appear because of misposition. A number of solutions have been proposed to permit an increase in the track density to that approaching the rigid disk drives, which is in the order of 100–200 TPI and sometimes higher. One proposed solution is to provide specially pre-encoded tracks on one surface which tracks contain servo data enabling the head positioning servo to home in on the centre of the track, thereby positioning the transducer head accurately over the centre of the data track encoded on another surface. However, this solution is too unwieldly and too costly to implement on low cost flexible disk drives. Other proposed systems are approximate in that they compensate for changes in the dimensions of the drive rather than in the disks themselves.

An object of the present invention is to provide a positioning system and method which can be implemented at relatively low cost for accurately positioning a device with respect to a body despite temperature and humidity variations, which system and method are particularly useful for disk drives to enable higher track densities to be obtained.

According to one aspect of the present invention, there is provided a system for accurately positioning a device with respect to a reference on a body in accordance with a command position signal, despite temperature and humidity variations, comprising: measuring means for measuring the actual dimensional deviation of said body from its true dimension over a predetermined distance therealong and for producing a cumulative offset signal indicative of the cumulative deviation over said predetermined distance; computing means effective, upon the reception of a command position signal specifying a commanded displacement of said device, for producing a corrected position signal specifying said commanded displacement corrected by the deviation of said cumulative offset signal pro-rated over the distance of said commanded displacement; and positioning means for positioning said device in accordance with said corrected position signal.

According to a more specific aspect of the invention, the computing means comprises means for computing from said cumulative offset signal a gradient offset signal corresponding to the linear variation of said cumulative offset signal over said predetermined distance, and for utilising said gradient offset signal in producing said corrected position signal.

In the preferred embodiments of the invention described below, the measuring means periodically measures the actual dimensional deviation of the body from its true dimension over a predetermined distance thereof defined by two fixed reference points on the body, stores a value corresponding to said measurement, and utilises said latter value for producing the corrected position signal upon the reception of the command position signal.

The invention also provides a method for accurately positioning a device with respect to a reference on a body in accordance with a command position signal, despite temperature and humidity variations, comprising the steps: measuring the actual dimensional deviation of said body from its true dimension over a predetermined distance therealong and producing a cumulative offset signal indicative of the deviation over said predetermined distance; upon the reception of a command position signal specifying a commanded displacement of the device, producing a corrected position signal specifying said commanded displacement corrected by said cumulative offset signal pro-rated over the distance of said commanded displacement; and positioning said device in accordance with said corrected position signal.

The invention is particularly useful, and is therefore described below, in a system wherein the device to be positioned is a magnetic head, and the body with respect to which it is positioned is a multi-track record disk.

The invention may be implemented by conventional logic circuitry, but is preferably implemented by a microprocessor. Examples of both implementations are described below.

Further features and advantages of the invention will be apparent from the description below of two preferred embodiments thereof illustrated in the accompanying drawings, wherein.

It has been found that the dimensional deviation of a record disk because of temperature and humidity changes is substantially linear with increasing radius. The presently used ¢floppy disks" (which are plastic disks of 7¾ inches diameter coated with magnetic oxide) exhibit an expansion increasing linearly with increasing radius over the disk surface at the rate of ≈17μin./in./° C. Expansion is typically 0.005 inches maximum on the inside track and 0.015 inches maximum on the outside track over the permitted operating temperature and humidity range for the medium. Thus, by periodically measuring the total dimensional deviation of the record disk from its true dimension over a predetermined distance, the measured deviation may be interpolated or pro-rated for any specific portion of the distance and may be used for accurately positioning the head to a specified location despite the dimensional deviation of the disk because of temperature and humidity conditions.

Figure 1:
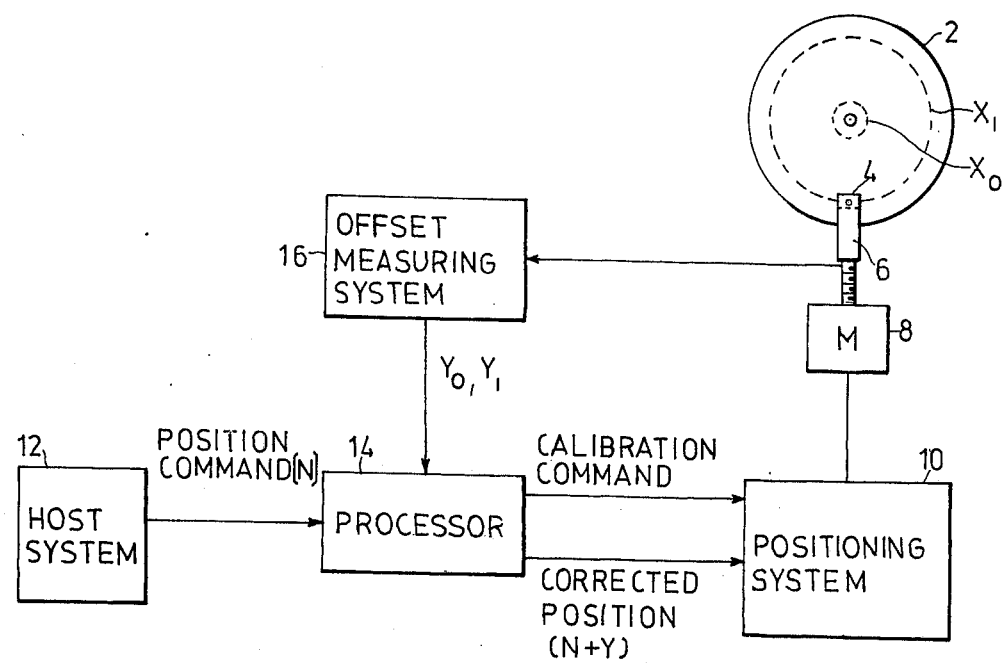
FIG. 1 is a functional block diagram illustrating the generalized concept of a magnetic head positioning system constructed in accordance with the present invention.

FIG. 1 illustrates in generalized form a magnetic head positioning system constructed in accordance with the invention, wherein the magnetic disk is provided with two "servo" tracks for use as references for measuring the actual dimensional deviation of the disk from its true dimension. Thus, FIG. 1 illustrates the magnetic disk 2 as including an inner servo track $X_0$ specifying track "0," and an outer servo track $X_1$ specifying track "256." Providing two such tracks enables an accurate offset gradient to be computed for any particular disk and also simplifies the computation to produce the corrected position signal, as will be described more particularly below.

Figure 2:
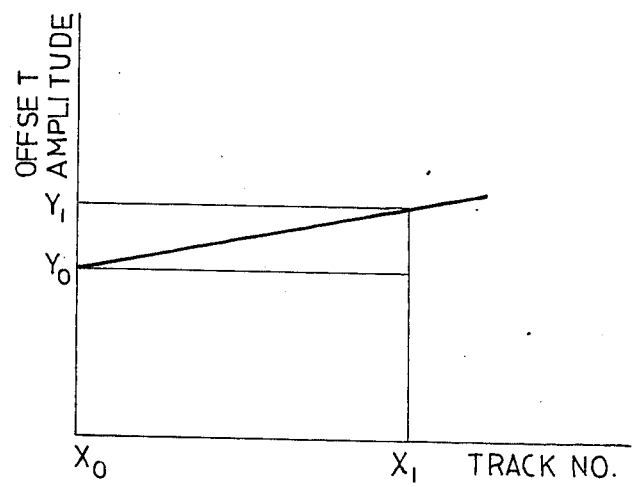
FIG. 2 is a diagram helpful in understanding the invention.

The magnetic head 4 is carried by a carriage 6 driven by a motor 8 controlled by a positioning system 10 to bring the head to a track address as specified in the address portion of a Position Command signal received from a host system 12 via a processor 14. To correct for dimensional deviations in the record disk because of temperature and humidity variations, a Calibration Command signal is periodically outputted from the processor 14 to the positioner system 10 which causes same to drive the head 4 first to the inner servo track $X_0$ while an offset measuring system 16 measures the deviation ($Y_0$) of the record disk from its true dimension at that track (FIG. 2), and then to the outer servo track $X_1$ while the offset measuring system 16 measures the deviation ($Y_1$) of the record disk from its true dimension at that track. The values $Y_0$ and $Y_1$ are fed to the processor 14 which produces a cumulative offset signal corresponding to the measured deviation ($Y_1-Y_0$) over the distance between the servo tracks $X_1$ and $X_0$. The gradient offset ($Y_1-Y_0$)/($X_1-X_0$), i.e., the linear variation of the cumulative offset over the distance between the servo tracks, may then be computed, stored and utilized to correct the positioner system for temperature and humidity variations. Thus, whenever a Position Command signal is received specifying a track address, the required offset Y, pro-rated for the distance specified by the Position Command signal and to be added to the Position Command signal, is computed as follows:

$$Y = (Y_1 - Y_0)/(X_1 - X_0) \cdot N + Y_0$$

where N is the track address specified by the Position Command signal.

Figure 3:
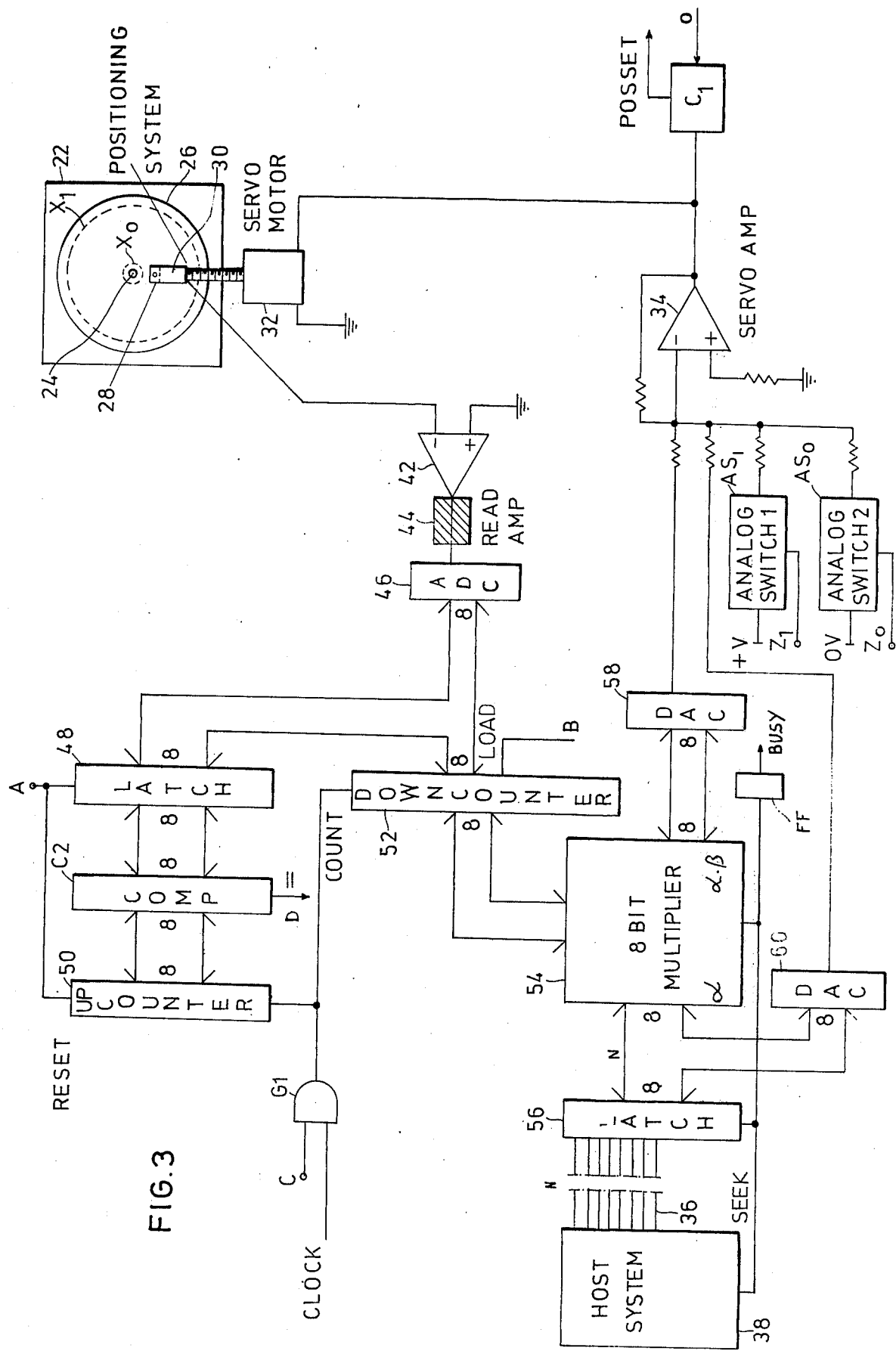
FIG. 3 is a functional block diagram illustrating a conventional logic circuitry implementation of the invention.
Figure 4:
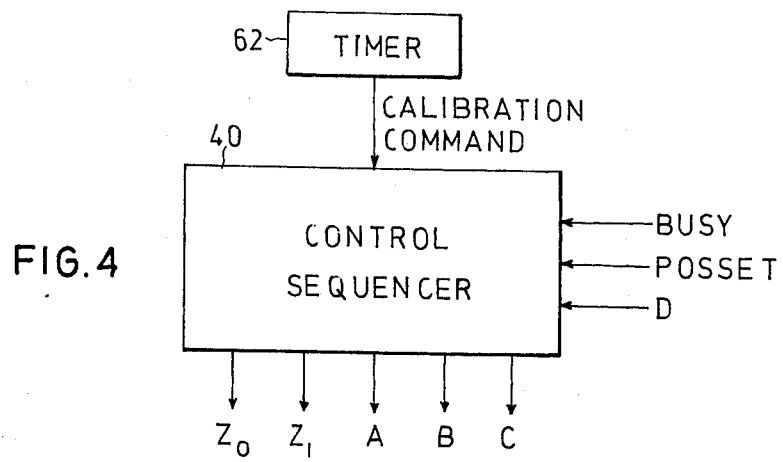
FIG. 4 is a diagram of a States Machine used in the system of FIG. 3.
Figure 5:
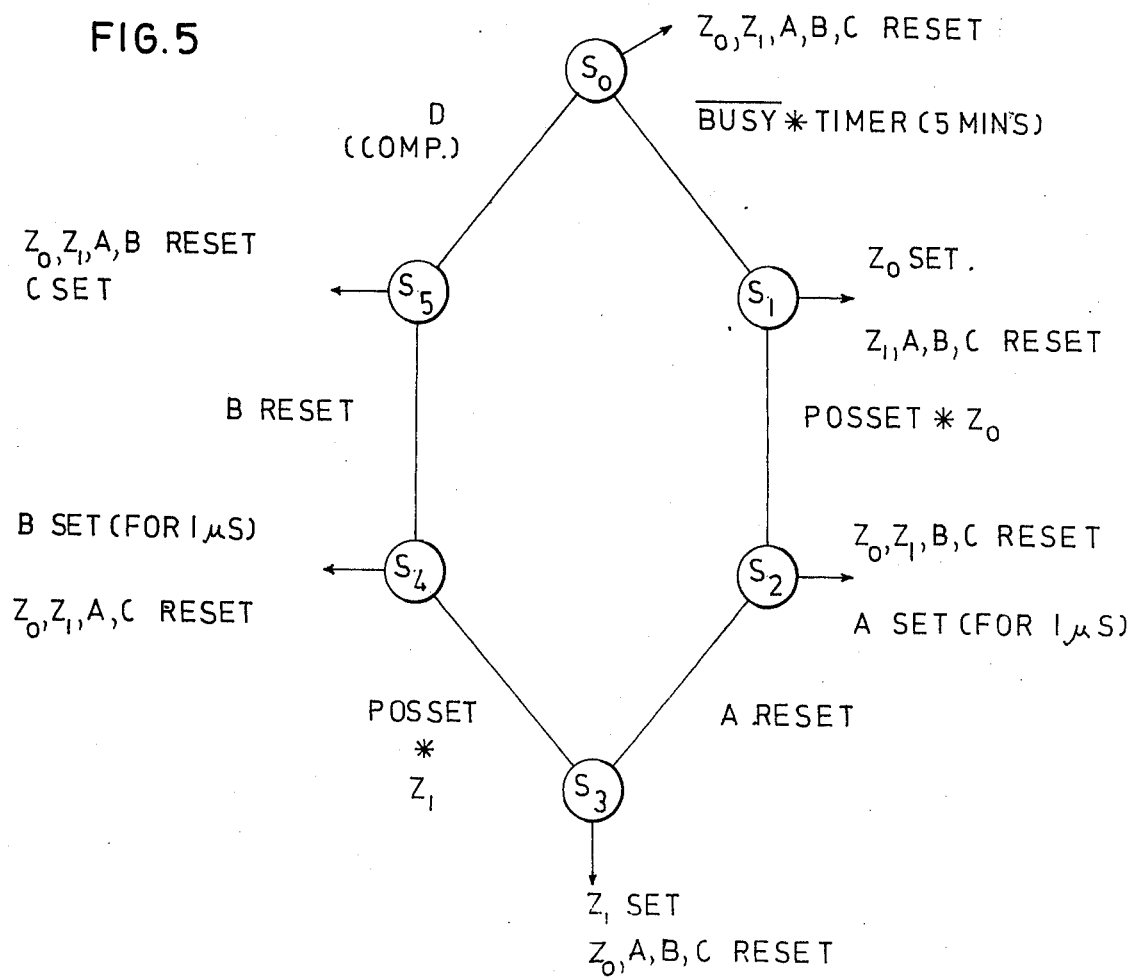
FIG. 5 is a States Diagram of the Machine of FIG. 4.

FIGS. 3–5 illustrate a conventional logic circuit implementation of the head positioning system, and FIGS. 6–10 illustrate a microprocessor implementation of such a system.

Shown in FIG. 3 is a drive, generally designated 22, including a hub 24 for receiving a multi-track record disk 26 such as a flexible (or "floppy") disk mentioned earlier which is subject to dimensional variations because of temperature and humidity changes. A magnetic head 28 is movable to any selected track on the record disk by means of a carriage 30 driven by a servo motor 32 fed by a servo amplifier 34. The track address is specified in the address lines 36 upon the issuance of a Position Command (SEEK) from the host system 38.

To enable an accurate offset gradient to be computed for any particular disk under the prevailing temperature and humidity conditions, the disk 26 is provided with the two servo tracks mentioned above, namely inner track $X_0$ specifying track "0," and outer track $X_1$ specifying track "256."

A calibration sequence is periodically (e.g. every 5 minutes) initiated during idle time of the system, i.e. when the disk is not in the process of reading, writing or seeking a track. The "reading or writing" status is flagged by a low output on POSSET (position settled) line from a comparator $C_1$ which line goes high when no output is produced by amplifier 34; and the "seeking" status is flagged by a high output on SEEK line from the host system to a flip-flop FF which produces a high signal on its output BUSY line. During this calibration sequence, a control sequencer 40 (FIG. 4) produces a high signal on line $Z_0$ enabling an analogue switch AS0 to output zero volts to servo amplifier 34 which controls motor 32 to bring the head 28 to the inner servo track $X_0$ (track "0"). When the head has settled in position, the offset ($Y_0$) at track $X_0$ is read via an amplifier 42 and an offset measuring system 44 of known type producing an analog output corresponding to the deviation or offset of the head position from the true centre of the servo track. This analog offset is converted into digital form by an analog-to-digital converter (ADC) 46 which loads a latch 48 with the measured offset. Latch 48 is enabled to receive this measurement by a high signal on line "A," which signal also resets an up-counter 50.

The control sequencer 40 then drives line $Z_0$ low, and line $Z_1$ high, enabling analog switch AS1 to apply "plus" volts to amplifier 34 to cause motor 32 to drive the magnetic head 28 to track $X_1$ (track 256). When the head has settled in position, the offset at this track is measured by amplifier 42 and the offset measuring system 44, and is loaded, via ADC 46, into down-counter 52. The latter is enabled by a high signal applied from control sequencer 40 on line "B," which also applies a low signal on line "A" to disable latch 48.

It will be seen that, at this instant, the measured offset ($Y_0$) with respect to the inner track $X_0$ is stored in latch 48, and the measured offset ($Y_1$) with respect to the outer track $X_1$ is stored in down-counter 52.

The contents of latch 48 are then subtracted from the contents of the down-counter 52 by means of a circuit which includes an AND-gate G1 enabled by a signal on line "C" from control sequencer 40 to pass clock pulses to increment up-counter 50 and to decrement down-counter 52 until the value in the up-counter equals that of latch 48 as detected by comparator C2. Equality is detected by a high signal on line "D," at which time the contents of the down-counter 52 equals the cumulative offset ($Y_1-Y_0$) measured between tracks $X_0$ and $X_1$.

This cumulative offset may then be divided by "256" (i.e., the number of tracks between track $X_0$ and $X_1$) to compute the gradient offset corresponding to the linear variation of the cumulative offset over the distance between tracks $X_0$ and $X_1$; and whenever it is desired to pro-rate or interpolate the cumulative offset over the distance of a commanded displacement (i.e., a specified track address), it would only be necessary to multiply the gradient offset by the specified track address.

The arrangement illustrated in FIG. 3 uses an 8-bit multiplier 54 for effecting the latter multiplication.

Multiplying two 8-bit numbers produces a 16-bit product, which may be conveniently divided by "256" by merely dropping the eight least significant bits. Accordingly, by merely dropping the eight least significant bits in the output of multiplier 54, and using only the eight most significant bits, a division by "256" is effected to convert the cumulative offset measured between tracks $X_0$ and $X_1$ to the gradient offset.

It will thus be seen that the output from the 8-bit multiplier 54, produced by multiplying the measured cumulative offset $(Y_1-Y_0)$ between tracks $X_0$ and $X_1$, and the specified track address (N), and dividing same by "256" (the distance $X_1-X_0$), effected by dropping the eight least significant bit of the product, constitutes the measured offset pro-rated over the distance of the specified address.

The specified address (N) on input line 36 from the host system 38 is fed via a latch 56 to the multiplier 54, and its output, representing the offset pro-rated with respect to the specified address, is fed to a digital-to-analog-converter (DAC) 58. The specified address (N) is also fed via latch 56 to a second digital-to-analogue converter (DAC) 60. The outputs of the two DAC's 58, 60 are summed in the servo amplifier 34 and are used to position the magnetic head 28 at the precise location specified by address N as corrected by the measured offset pro-rated for that specified address.

FIG. 5 is a States Diagram more particularly illustrating the operation of the circuit of FIG. 3 as controlled by the States Machine of FIG. 4. The State Machine of FIG. 4 includes a Control Sequencer 40 having three "status" inputs, namely: "BUSY" status, specifying whether the magnetic head is in the process of seeking a track by virtue of a SEEK signal from the host system; a "POSSET" status, specifying whether the magnetic head has settled in position after having been driven to a specified track; and "D" status from comparator $C_2$, specifying that equality has been detected between the contents of latch 48 and up-counter 50 as described above. Control sequencer 40 has five outputs, namely: $Z_0$, commanding the head to move to track $X_0$; $Z_1$, commanding the head to move to track $X_1$; "A," enabling latch 48 and resetting up-counter 50; "B," enabling down-counter 52; and "C," enabling the clock pulses to pass through gate G1 to up-counter 50 and down-counter 52. A timer 62 periodically initiates a calibration sequence, for example every five minutes or any other suitable time interval.

When a calibration sequence is initiated by timer 62, the system moves through the following states:

State $S_0$ is the idle state, at which time all the outputs from the control sequencer 40 are reset.

The system moves to State $S_1$ whenever an output signal is received from timer 62, provided the host system 38 is not in a "BUSY" status, i.e., the head is not reading, writing or seeking a track. In State $S_1$, the sequence controller sets $Z_0$, which causes the servo amplifier 34 to drive motor 32 to bring the head 28 to the inner servo track $X_0$, the other outputs of the sequencer being reset.

When the head has settled in position, as determined by a POSSET status, the system moves to State $S_2$. In this state, the control sequencer 40 resets $Z_0$ and sets "A" for a short time (e.g. 1μS), which resets up-counter 50 and enables latch 48 to receive the offset measured at track $X_0$ from the offset measuring circuit 44 and ADC 46. At the end of this short interval, "A" is reset, whereupon the system moves to State $S_3$.

In State $S_3$, the control sequencer 40 sets $Z_1$ and resets its remaining outputs, whereupon the magnetic head is driven to track $X_1$. When the head settles in this position (POSSET status), the system moves to State $S_4$, whereupon "B" is set for a short interval (e.g. 1μs) which enables the down-counter 52 to receive the measured offset with respect to track $X_1$. After this short interval, "B" is reset and the system moves to State $S_5$, whereupon "C" is set, enabling gate G1 to pass the clock pulses to increment the up-counter 50 and to decrement the down-counter 52 until the contents of the up-counter equals that of latch 48. This is detected by comparator C2, which outputs a "D" signal, indicating, equality to the control sequencer 40, moving the system to the original idle State $S_0$.

It will thus be seen that during this sequence, the system has measured the total offset $(Y_1-Y_0)$ between tracks $X_0$ and $X_1$ and has stored this value in down-counter 52.

As described earlier, when an address (N) is specified on input bus 36 from the host system 38, this address is fed via latch 56 to DAC 60 and, in addition, to the eight-bit multiplier 54. The latter multiplies the address (N) by the stored measured offset $(Y_1-Y_0)$ and at the same time divides this value (by dropping the eight least significant bits from the product) by the number of tracks ("256") between the servo tracks $X_0$ and $X_1$. This produces a value corresponding to the gradient offset multiplied by the number of tracks specified in the address to produce an output corresponding to the measured offset pro-rated over the number of tracks specified in the address on input bus 38. This pro-rated offset is fed to digital-to-analogue converter DAC 58 and is summed in servo amplifier 34 with the value corresponding to the specified address from DAC 60. The output of the servo amplifier 34, used to control servo motor 32 to drive the magnetic head 28 to the specified address, will now accurately position the head to the specified address as corrected by the measured deviation of the disk from its true dimensions caused by temperature and humidity conditions.

Figure 6:
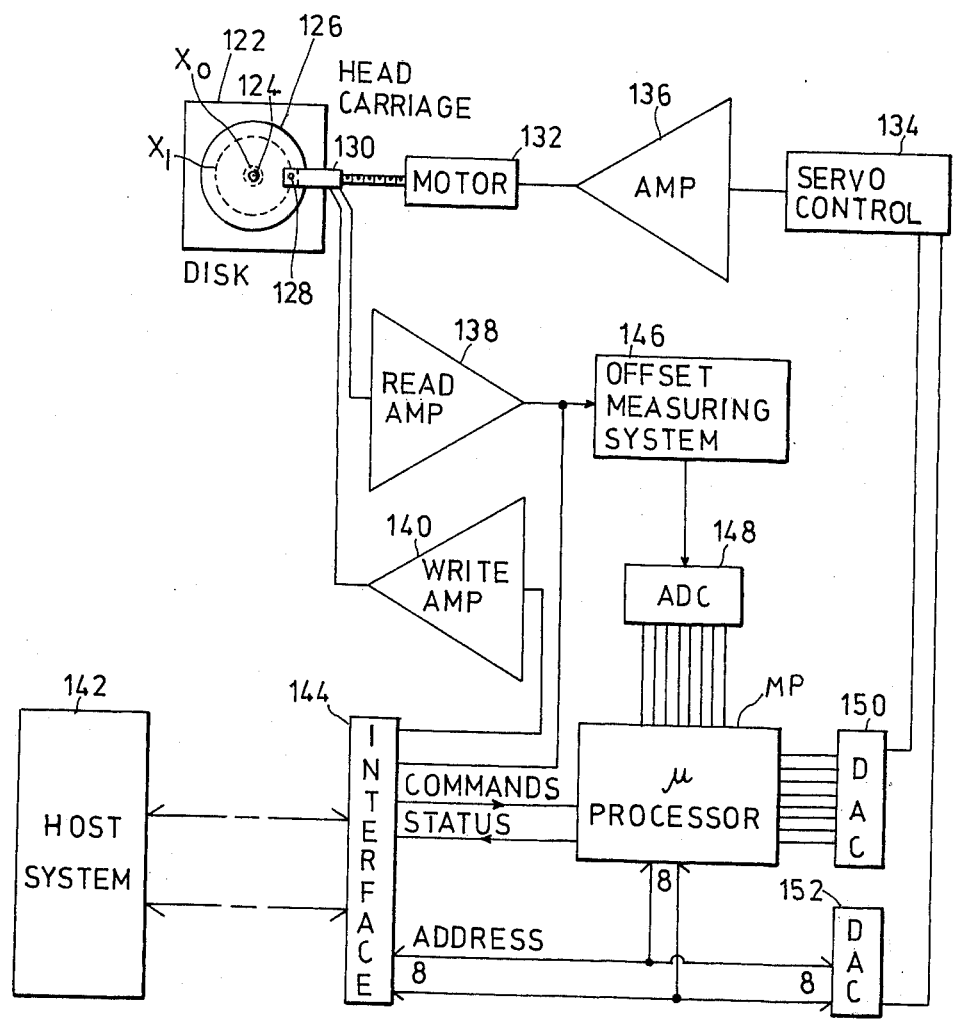
FIG. 6 is a block diagram illustrating a microprocessor implementation of the invention.

FIG. 6 is a diagram illustrating a microprocessor implementation of the above-described system.

The system illustrated in FIG. 6 includes a disk drive unit, generally designated 122, having a central hub 124 for the disk 126 provided with the two servo tracks $X_0$, $X_1$ as described above. The magnetic head 128 is carried by a carriage 130 driven by a motor 132 fed from a servo control system 134 via an amplifier 136. Information may be read out of the record tracks via a read amplifier 138 or into the record tracks via a write amplifier 140 into or from a host system 142 via an interface 144. A microprocessor MP periodically sends the magnetic head first to track $X_0$ where the offset at that track is measured by an offset measuring circuit 146 via read amplifier 138, and then to track $X_1$ where the offset at that track is measured. The measured offsets are converted to digital form via an ADC 148 before being inputted into the microprocessor MP.

The microprocessor MP stores the measured cumulative offset $(Y_1-Y_0)$ or the offset gradient computed by dividing the measured cumulative offset by the distance between the servo tracks $X_0$ and $X_1$, i.e. $(Y_1-Y_0)$ $(X_1-X_0)$. When a SEEK command is received from the host system 142 via interface 144, specifying a particular address (N) for the magnetic head, the microprocessor computes the correct position in order to compensate for humidity and temperature variations, and outputs this information to DAC 150. The original address (N) from the host system 142 is outputted to DAC 152, and is summed with the output of DAC 150 in the servo control system 134 where it is fed, via amplifier 136, to the drive motor 132 to drive the magnetic head 128 to the specified address.

Figure 7:
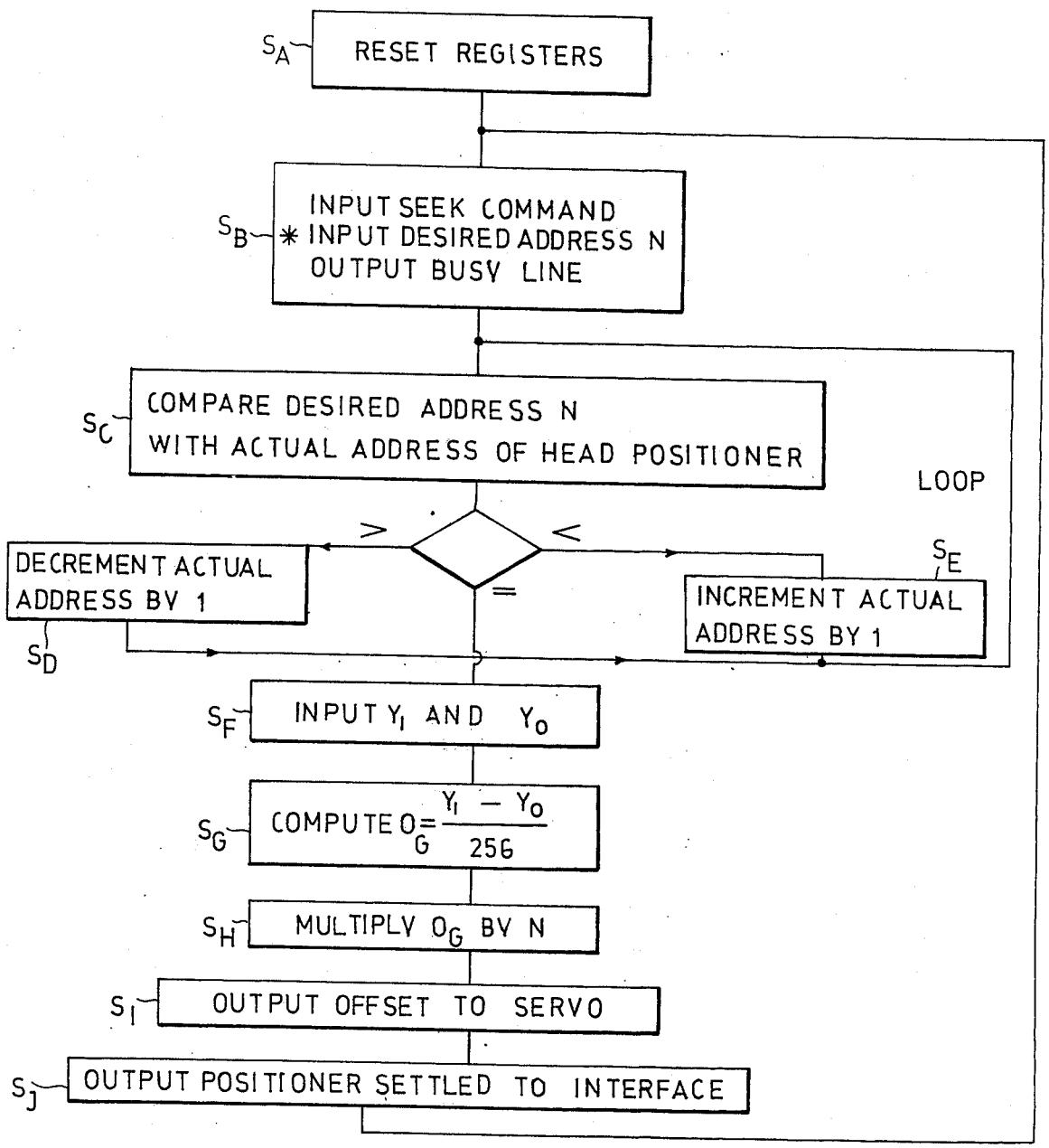
FIG. 7 is a flow diagram illustrating the operation of the microprocessor in the system of FIG. 6.

FIG. 7 is a state flow chart illustrating the sequential operation of the system programmed as described above. Thus, in the initialized State $S_A$, the microprocessor registers are reset. The system advances to State $S_B$ upon receiving an input SEEK command from the host system 142 specifying a track address (N), during which state the system signals its BUSY status disabling it from entering the Calibration Sequence described above where it measures and computes the cumulative offset $Y_1 31 Y_0$ between servo tracks $X_1$ and $X_0$. In State $S_C$ the system compares the desired (specified) address N with the actual address (i.e., where the head is at that instant). If the desired address is below the actual address, the actual address is decremented by "1" (State $S_D$) and returned to State $S_C$; and if it is above, the actual address is incremented by "1" (State $S_E$) and returned to State $S_C$. When equality is detected, the system moves to State $S_F$, where the measured offsets $Y_1$ and $Y_0$ at the servo tracks $X_1$ and $X_0$ are inputted into the registers of the microprocessor, it being recalled that these offsets are periodically being computed during the idle time of the system. The system then moves to State $S_G$ where the gradient offset ($O_G$) is computed by dividing the cumulative offset $(Y_1-Y_0)$ by the number of tracks (256) between the servo tracks $X_1$ and $X_0$. The system then moves to State $S_H$ where the gradient offset ($O_G$) is multiplied by the specified track address (N) to produce the pro-rated offset for that track address outputted (via DAC 150, FIG. 6) to the servo control circuit 134 during the next State $S_I$. When the head has settled in position (State $S_J$), the system returns to its START condition, and it awaits the reception of the next SEEK command from the host system, the system periodically entering the Calibration Sequence during idle periods to continuously up-date the offset values $Y_0$ and $Y_1$.

Figure 8:
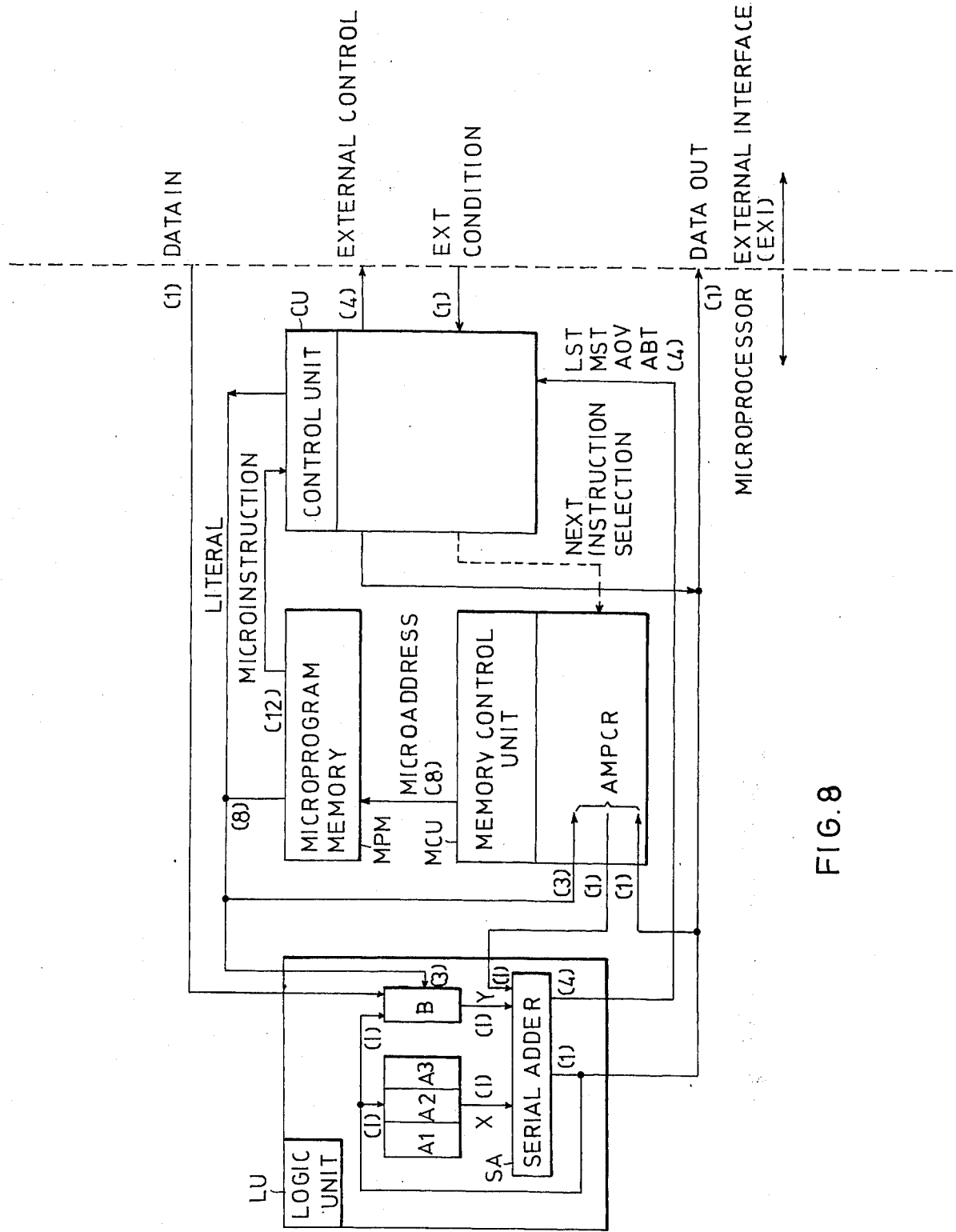
FIG. 8 is a block diagram illustrating the organisation of a microprocessor that may be used in the system of FIG. 6.
Figure 9:
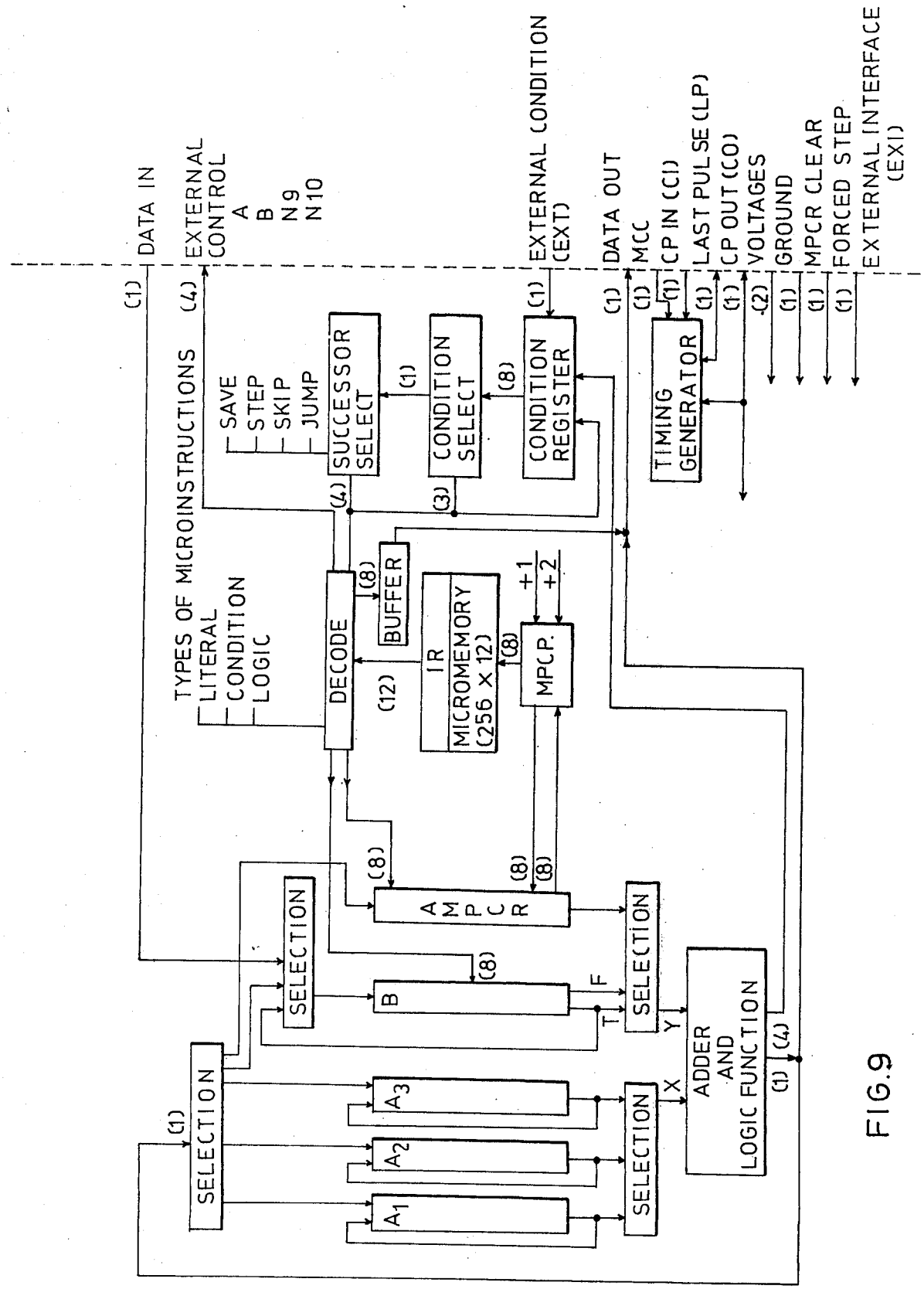
FIG. 9 is a block diagram illustrating the functional components of the microprocessor of FIG. 8.

FIGS. 8 and 9 illustrate the organisation and the functional details, respectively, of a commercially available microprocessor that may be used in the microprocessor implementation of the system of FIGS. 6 and 7. Further details of the microprocessor are designed in United Kingdom Patent No. 1,429,379 of July 24, 1973, corresponding to U.S. Pat. No. 3,878,514 of Apr. 15, 1975.

The illustrated microprocessor is a single chip one implemented in P-channel MOS technology in a 16-pin DIP package with a 9-μs. instruction rate and having a TTL compatible interface. As shown in FIG. 8, it has two basic interface signal terminals for external data, namely, a bit-serial-by-byte input terminal DATAIN, and a bit-serial-by-byte output terminal DATAOUT. Information is normally shifted into the microprocessor from an external shift register. The microprocessor can select one of four such input registers in one instruction; conversely, it can load one of five output registers in another instruction. Consequently, the microprocessor can manipulate any one of nine registers, where each register can be of any length.

The microprocessor consists of five functional parts, namely:

| | | |
|---|---|---|
| LU | Logic Unit | Data Registers, serial adder. |
| MPM | Microprogram Memory | Microinstruction sequences created by the microprogrammer. |
| MCU | Memory Control Unit | Registers for microprogram memory addressing |
| CU | Control Unit | Timing and conditional control, successor determination, and instruction decoding. |
| EXI | External Interface | A 16-pin interface to the external environment. |

The machine, although serially implemented, appears to the programmer as an 8-bit parallel machine for all data functions.

Logic Unit LU consists of three 8-bit registers (A1, A2, A3), an 8-bit B-register, a serial adder SA, and selectors. The registers are recirculating static shift registers so that information can be transferred into the adder without changing the contents of the registers. The inputs to the adder on the X-select are any of the A-registers or zero, and on the Y-select are the B-register or its complement, the alternate microprogram count register (AMPCR), or zero. The output from the adder can be gated into A1, A2, A3, B, AMPCR and external registers (via the DATAOUT line). The adder itself is capable of eight operations (X+Y, X+Y+1, XOR, EQV, AND, OR, NAND, NOR). The adder also feeds four conditions to the condition register, "least bit true" (LST), "most bit true" (MST), "overflow" (AOV) and "all bits true" (ABT). These conditions are set when the associated bit is true, and reset, when false. These Logic Unit conditions do not change until the next logic unit operation and are testable using the condition test instruction.

Memory Control Unit MCU consists primarily of two 8-bit registers: the Microprogram Count Register MPCR and the Alternate Microprogram Count Register AMPCR. The MPCR is an 8-bit counter that can be incremented by one or two. The AMPCR stores jump addresses for changing the sequence of instructions. The MPCR selects the next instruction (successor) from the microprogram memory.

The Microprogram Memory PMP may contain up to 256 words, each 12 bits in length. The memory contains only executable instructions and cannot be changed under program control. The 12-bit instructions are decoded into one of three types: literal, conditional, and logical. Eight of these 12 bits can be transferred directly into the AMPCR, B-register, or the external device (DEV) control register.

The Control Unit CU provides eight testable conditions, condition selection logic, successor determination, instruction decoding logic, and timing for the processor. The eight conditions which may be tested are: AOV, MST, LST, ABT (mentioned above), plus three local conditions set or reset by the program, LC1, LC2, LC3; plus an external asynchronous condition EXT. The successor selection is either: MPCR+1; MPCR+2; AMPCR; or MPCR+1 (which also goes to AMPCR). These successors are called STEP, SKIP, JUMP and SAVE, respectively. The microprocessor uses an external clock input (CI) for internal timing. During each instruction, nine clocks are used, one for setup and eight for data. After the last data clock, the microprocessor checks for the Memory Cycle Continue (MCC) level before starting the next instruction. In continuous operation, this signal is true. The control unit also provides two outgoing timing signals: Clock Out (CO) carries the eight data shift pulses for external register clocking; and Last Pulse (LP) which indicates the end of each instruction and the start of the next operation.

The 16-pin external interface accommodates four types of signals: 1) Data, 2) Control, 3) Timing, and 4) Power (+5 volts, −12 volts, ground).

Data Signals

The DATAIN is the main input for data into the microprocessor. The data is controlled by the BEX command in the logic unit instruction, which enables the serial gating of information into the B-register.

The EXT input condition level is controlled externally and tested by the condition test instruction. It can be used for example to: (1) receive input data, (2) indicate an interrupt is present in an external interrupt register, or (3) have externally selected meaning for various external devices.

The DATAOUT line is the data output interface from the microprocessor. The information is always sent out in 8-bit bursts and can be synchronously gated into an external shift register using the CO clock pulses.

Control Signals

The four External Control signals from the microprocessor control the gating of information into and out of the microprocessor and also indicate how information is to be used by the interface. Two lines, A and B, when decoded, designate the type of operation taking place internal and external to the microprocessor. The combinations are as follows: BEX (A=1, B=0) indicates a Logic Unit Instruction (see Table 2 below) is in progress with one of four BEX destinations and the external data is gated into the B-register; OUT (A=0, B=1) indicates the Logic Unit Instruction is in progress with one of the four OUT destinations selected; DEV (A=1, B=1) indicates an external Literal Instruction (see Table 1 below) is in progress internally and an 8-bit literal from MPM is being transferred out of the microprocessor on the DATAOUT line to the external DEVICE control register; and (A=0, B=0) is the default code for all other internal instructions other than the three specified above (i.e., BEX, OUT, and DEV).

The other two pins of the four external control lines are bits 9 and 10, respectively, of the microprogram instruction. These lines come out ungated and can be combined with the decoded BEX and OUT to determine which of the four external registers was internally selected.

The MPCR Clear signal clears the MPCR register such that the next instruction to be executed will be location zero.

The FORCED STEP signal is used for chip test only where the contents of the Microprogram Memory (MPM) is dumped to the external interface.

Timing Signals

The Memory Cycle Continue (MCC) level initiates the start of an instruction by enabling the internal timing generator. This timing generator creates internal shift pulses from the clock input. This level can be used to slow the execution of an MPM instruction to any frequency including single step.

Input clock pulses (CI) feed the timing generator controlling bit frequency; the pulses produced from the timing generator are used to gate and control all the internal and external shift registers. The Clock Output (CO) shift pulses from the timing generator are used to synchronize the external registers. The last pulse (LP) indicates that eight data shaft pulses have occurred. Therefore the external registers are (1) loaded, or (2) information has been accepted by the microprocessor.

The Instruction Set includes basically three instruction types as shown in Tables 1–3 below, namely: (1) Literal (2) Condition Test, and (3) Logic Unit.

1. Literal Instructions

There are four Literal type instructions each utilizing an 8-bit constant from Micro Program Memory: Literal to B, Literal to AMPCR, GOTO (i.e. literal to MPCR) and Literal to External Device (DEV) register. Examples of these assembly instructions are as follows: 25 = :B, table = :AMPCR, GOTO loop, xmit = :DEV. Note the names (table, loop, xmit) would be defined as an 8-bit value by the programmer to the assembler.

2. Condition Test Instructions

The Condition Test instruction checks one of eight specified conditions (i.e. four logic, three local flags, one external) and executes the indicated true or false successor depending on the outcome of the test. The successors are STEP, SKIP, JUMP and SAVE. If one wishes to have an unconditional successor, both fields should have the same successor. Example: JUMP is the equivalent to IFAOVJUMPELSEJUMP. If the tested condition is true, one of the three local conditions can be optionally set. Local conditions are reset on testing.

3. Logical Instructions

As described previously, the adder is capable of eight operations from which over 20 basic operations are available with appropriate X and Y register selects. The destination is determined by the designated instruction field. The Y select and operations are combined so not all combinations are available. Note AMPCR (indicated by Z in the Y select field) will be zero unless the AMPCR is selected as a destination. The destination field has four major groups: four Internal registers; four Output registers; simultaneous loading the B-register from external (BEX) together with the adder loading the selected internal register; and single bit right shift of the selected internal registers with adder filling the most bit.

Timing: The fetch of the next instruction and the execution of the present instruction are overlapped. This fetch-execute cycle requires 9 clocks pulses; therefore, with a 1-MHz clock, 9 microseconds is the instruction execution time.

The following Tables 1, 2 and 3 illustrate Literal Instructions, Logic Test Instructions, and Condition Test Instructions, respectively.

Table 1

| | | | | | Literal Instructions | | | | | | |
|---|---|---|---|---|---|---|---|---|---|---|---|
| 1 | 2 | 3 | 4 | 5 | 6 | 7 | 8 | 9 | 10 | 11 | 12 |
| Literal From MPM →B | | | | | | | | 1 | 0 | 1 | 1 |
| 1 | 2 | 3 | 4 | 5 | 6 | 7 | 8 | 9 | 10 | 11 | 12 |
| Literal Jump Address →AMPCR | | | | | | | | Not | Used | 0 | 0 |
| GO TO Literal | | | | | | | | Not | Used | 1 | 0 |
| 1 | 2 | 3 | 4 | 5 | 6 | 7 | 8 | 9 | 10 | 11 | 12 |
| Literal→DEVice External | | | | | | | | 0 | 0 | 1 | 1 |

Table 2

Logic Unit Instruction

| 1 2 | 3 4 | 5 6 7 8 9 | 10 11 12 | | |
|---|---|---|---|---|---|
| X Select | Operation & Y Select | | Destination Select | 0 | 1 |
| 00 | 0 0000 | X + B + 1 | 0000 | B | |
| 01 | A1 0001 | X + B | 0001 | A1 | |
| 10 | A2 0010* | X + Z + 1 | 0010 | A2 | |
| 11 | A3 0011* | X + Z | 0011 | A3 | |
| | 0100 | X EQV B ($\overline{XB}$ v XB) | 0100 | OUT0, — | |
| | 0101 | X XOR B ($\overline{XB}$ v $\overline{XB}$) | 0101 | OUT1 | |
| | 0110 | X − B (X + $\overline{B}$ + 1) | 0110 | OUT2 | |
| | 0111 | X − B − 1 (X + $\overline{B}$) | 0111 | *AMPCR, OUT3 | |
| | 1000 | X NOR B ($\overline{X v B}$) | 1000 | B, BEX | |
| | 1001 | X NAN E($\overline{XB}$) | 1001 | A1, BEX | |
| | 1010* | X NOR Z ($\overline{XvZ}$) | 1010 | A2, BEX | |
| | 1011* | X NAN Z ($\overline{XZ}$) | 1011 | A3, BEX | |
| | 1100 | X OR B (XvB) | 1100 | B S | |
| | 1101 | X AND B (XB) | 1101 | A1 S | |
| | 1110 | X RIM B (Xv$\overline{B}$) | 1110 | A2 S | |
| | 1111 | X NIM B (X$\overline{B}$) | 1111 | A3 S | |

*AMPCR (indicated by Z in the Y select field) will be zero unless the AMPCR is selected as a destination

Table 3

Condition Test Instruction

| 1 2 3 | 4 5 | 6 7 | 8 9 | 10 11 12 |
|---|---|---|---|---|
| Condition Select | Set Operation | True Successor | False Successor | 1 1 |
| 000 MST | 00 Set LC1 | 00 Jump | 00 Jump | |
| 001 AOV | 01 Set LC2 | 01 Step | 01 Step | |
| 010 LST | 10 Set LC3 | 10 Skip | 10 Skip | |
| 011 ABT | 11 None | 11 Save | 11 Save | |
| 100 LC2 | | | | |
| 110 LC3 | | | | |
| 111 EXT | | | | |

The microprocessor illustrated in FIGS. 8 and 9 is programmed to perform the above-described functions in the magnetic head positioner system illustrated in FIGS. 6 and 7. Tables 4 and 5 below illustrate a program that may be used. The Addresses and the Instruction Labels are in the Hexadecimal notation, and Table 6 below illustrates how this notation may be converted to the binary notation.

TABLE 4

PROGRAM - POSITIONER

| Inst. | Add | Instr | Label | Mnemonic | Comments |
|---|---|---|---|---|---|
| 1 | 00 | 000 | | 0 → AMPCR | |
| 2 | 01 | 0L9 | | 0 → A2 | |
| 3 | 02 | 8MI | | A2 → OUT 0 | |
| 4 | 03 | /// | START | SAVE SAVE | |
| 5 | 04 | 0NI | | 0 → B, BEX | Input seek |
| 6 | 05 | 041 | | B → B | command |
| 7 | 06 | 5J7 | | IF LST STEP JUMP | |
| 8 | 07 | 003 | | 0 → DEV | STATUS - busy |
| 9 | 08 | 0N5 | | 0 → A1, BEX | Input Add |
| 10 | 09 | 045 | | B → A1 | |
| 11 | 0J | 4LI | LOOP | A1 → B | |
| 12 | 0K | 90M | | A2 EQV B → A3 | Compare for |
| 13 | 0L | 7K7 | | IF ABT STEP SKIP | Equality |
| 14 | 0M | 1L2 | | GO TO CALC | |
| 15 | 0N | 98M | | A2 − B → A3 | |
| 16 | 0/ | 01K | | 254 → B | |
| 17 | 10 | 3K7 | | IF AOV STEP SKIP | |
| 18 | 11 | 849 | | A2 + B → A2 | Subtract 2 |
| 19 | 12 | 889 | | A2 + 1 → A2 | Add 1 |
| 20 | 13 | 8MI | | A2 → OUT O | |
| 21 | 14 | OLM | | 0 → A3 | |
| 22 | 15 | 19K | | 231 → B | |
| 23 | 16 | /// | | SAVE SAVE | 100 mS timeout |
| 24 | 17 | L8M | | A3 + 1 → A3 | |
| 25 | 18 | 3J7 | | IF AOV STEP JUMP | |
| 26 | 19 | 001 | | B + 1 → B | |
| 27 | 1J | 3J7 | | IF AOV STEP JUMP | |
| 28 | 1K | 0J2 | | GO TO LOOP | |
| 29 | 1L | 8N9 | CALC | A2 → A2, BEX | Input offset 1 |
| 30 | 1M | 8MI | | A2 → OUT 1 | |
| 31 | IN | 045 | | B → A1 | |
| 32 | 1/ | 08K | | 248 → B | |
| 33 | 20 | 06M | | B → A3, BEX | Load A3 with 247 |
| 34 | 21 | 581 | | A1 − B → B | Input offset 2 |
| 35 | 22 | 0L5 | | 0 → A1 | Offset 1 - Offset 2 |
| 36 | 23 | 8/9 | MULT | A2 → A2, S | |
| 37 | 24 | 5K7 | | IF LST STEP SKIP | Test LSB |
| 38 | 25 | 445 | | A1 + B → A1 | Add |
| 39 | 26 | 0/5 | | 0 → A1, S | Shift |
| 40 | 27 | L8M | | A3 + 1 → A3 | Inc Counter |
| 41 | 28 | 7L/ | | IF ABT SKIP STEP | |
| 42 | 29 | 232 | | GO TO MULT | |
| 43 | 2J | 4M5 | | A1 → OUT 1 | Out-put Offset |
| 44 | 2K | //3 | | 255 → DEV | Out-put Status |

TABLE 4-continued

PROGRAM - POSITIONER

| Inst. | Add | Instr | Label | Mnemonic | Comments |
|---|---|---|---|---|---|
| 45 | 2L | 032 | | GO TO START | |

TABLE 5

| | | | | |
|---|---|---|---|---|
| BEX 0 | = Input Commands | OUT0 | = | Actual |
| BEX 1 | = Required Address | OUT 1 | = | Offset Output |
| BEX 2 | = Offset 1 | DEV | = | Status, Output |
| BEX 3 | = Offset 2 | B, A1 | = | Temporary Registers |
| | | A3 | = | Counter, Temporary Register |

TABLE 6

| Hexadecimal | | | Hexadecimal | | |
|---|---|---|---|---|---|
| True | Teletype | Binary | True | Teletype | Binary |
| 0 | 0 | 0 0 0 0 | 8 | 8 | 1 0 0 0 |
| 1 | 1 | 0 0 0 1 | 9 | 9 | 1 0 0 1 |
| 2 | 2 | 0 0 1 0 | A | J | 1 0 1 0 |
| 3 | 3 | 0 0 1 1 | B | K | 1 0 1 1 |
| 4 | 4 | 0 1 0 0 | C | L | 1 1 0 1 |
| 5 | 5 | 0 1 0 1 | D | M | 1 1 0 1 |
| 6 | 6 | 0 1 1 0 | E | N | 1 1 1 0 |
| 7 | 7 | 0 1 1 1 | F | / | 1 1 1 1 |

Following are additional comments which will be helpful in understanding the operation of the microprocessor of FIGS. 8 and 9 in accordance with the program of Table 4.

It will be seen that Instruction 1 (Address "00") can be converted (by reference to Table 5 above) from the hexadecimal notation "000" to the binary notation: 0000 0000 0000. The two rightmost (least significant) bits (00) specify a Literal Instruction, JUMP to AMPCR (Table 1); the next two bits are not used; and the remaining 8 bits specify that all 0's are to be loaded into the AMPCR. This instruction thus clears the AMPCR.

Instruction 2 (address "01") can be converted from the hexadecimal notation "0L9" to the binary notation: 0000 1100 1001. The two rightmost bits (01) specify a Logic Unit Instruction (Table 2); the next four bits (0010) specify Destination Select A2; the next four bits (0011) specify Operation Z; and the two leftmost bits (00) specify Select "0." This instruction thus calls for the clearing of register A2.

Instruction 3 (address "02") can be converted from the hexadecimal notation "8M1" to the binary notation: 1000 1101 0001. The two rightmost bits (01) specify a Logic Unit Instruction (Table 2) as the preceding instruction; the next four bits (0100) specify Destination Select OUT O; the next four bits specify the Operation is Z; the two leftmost bits (10) specify Select A2. This instruction thus calls for sending the contents of register A2 (which is 0 to OUT O, which in effect means to clear the OUT O register.

Instruction 4 (address "03") may be converted from the hexadecimal notation to the binary notation: 1111 1111 1111. The three rightmosst bits (111) specify a Condition Test Instruction (Table 3); and the next four bits (1111) specify a SAVE SAVE Instruction. Thus, this instruction says SAVE the contents of the next address in AMPCR (i.e., save address "04" in AMPRC). This is the JUMP Address; return to this address for every JUMP instruction until another SAVE SAVE Instruction.

Instruction 5 (address "04") may be converted from the hexadecimal notation 0N1 to: 0000 1110 0001. The two rightmost bits (01) specify a Logic Unit Instruction (Table 2); the next four bits (1000) specify a Destination Select B, BEX; the next four bits (0011) specify operation Z; and the two leftmost bits (00) specify Select O. This instruction thus says clear register B and take DATA IN into B; BEX means external to "B;" i.e. put the SEEK Command into B.

The program of Table 4 comprises 40 further instructions in addition to the five explained above, or a total of 45 instructions. It will be seen that, by reference to Tables 1-3, these 40 additional instructions call for the following:

Instuction 6 (address "05") is a Dummy Instruction; pass B through the adder to set up the condition flag in the adder.

Instruction 7 (address "06"): if LST is true, then STEP; else JUMP (i.e. back to AMPCR of instruction at address "03.") Actually, Instructions 6 and 7 form a fast idle loop to interrogate whether the SEEK Command is received.

Instruction 8 (address "07"): when LST is true (i.e. SEEK Command is received), then clear DEV register (the output status register); "0" means "busy" (STATUS = busy).

Instruction 9 (address "08"): clear register A1 and take DATA IN (desired address) into B.

Instruction 10 (address "09"): send contents of B to register A1.

Instruction 11 (address "OJ"): send contents of register A1 to register B (register A1 is a store).

Instruction 12 (address "OK"): compare A2 (current address) with B (desired address) and store in A3.

Instruction 13 (address "OL"): see whether equality is present; if "yes," go to instruction 14; if "no," go to instruction 15.

Instruction 14 (address "OM"): if equality, go to CALC (branch instruction 25).

Instructions 15-28 (addresses "ON"-"IK"): in effect say increment by "1" or decrement by "1" depending on whether desired (BEXO) greater or less than actual (A2) until equality obtained.

Instruction 29 (address "IL"): CALC loading offset 1 into BEX2 (B1 register).

Instruction 30 (address "IM"): output actual address to OUTPUT O.

Instruction 31 (address "IN"): transfer contents of B offset to A1.

Instruction 32 (address "1"): load the B-register with number "248;" this is part of a multiplier routine.

Instruction 33 (address "20"): transfer "248" to A3, and BEX3 into B; A3 is set up to indicate the number of shifts.

Instruction 34 (address "21"): input offsets of tracks T256-T0 ($X_1 - X_0$ in FIG. 6).

Instruction 35 (address "22"): clear A1; i.e. offset 1-offset 2.

Instructions 36-42 (addresses "23"-"29") constitute a multiplying sequence for multiplying A2 (track address) by B ($T_{256} - T_0$ offset), and dividing by "256," this being done by dropping the eight least significant bits and retaining the 8 most significant bits as described above.

Instruction 43 (address "2J"): put answer to OUT 1; i.e. output the offset.

Instruction 44 (address "2K"): clear the busy status (DEV register made all 1's which means "not busy").

Instruction 45 (address "2L"): go to START; i.e. loop for the next SEEK command.

Figure 10:
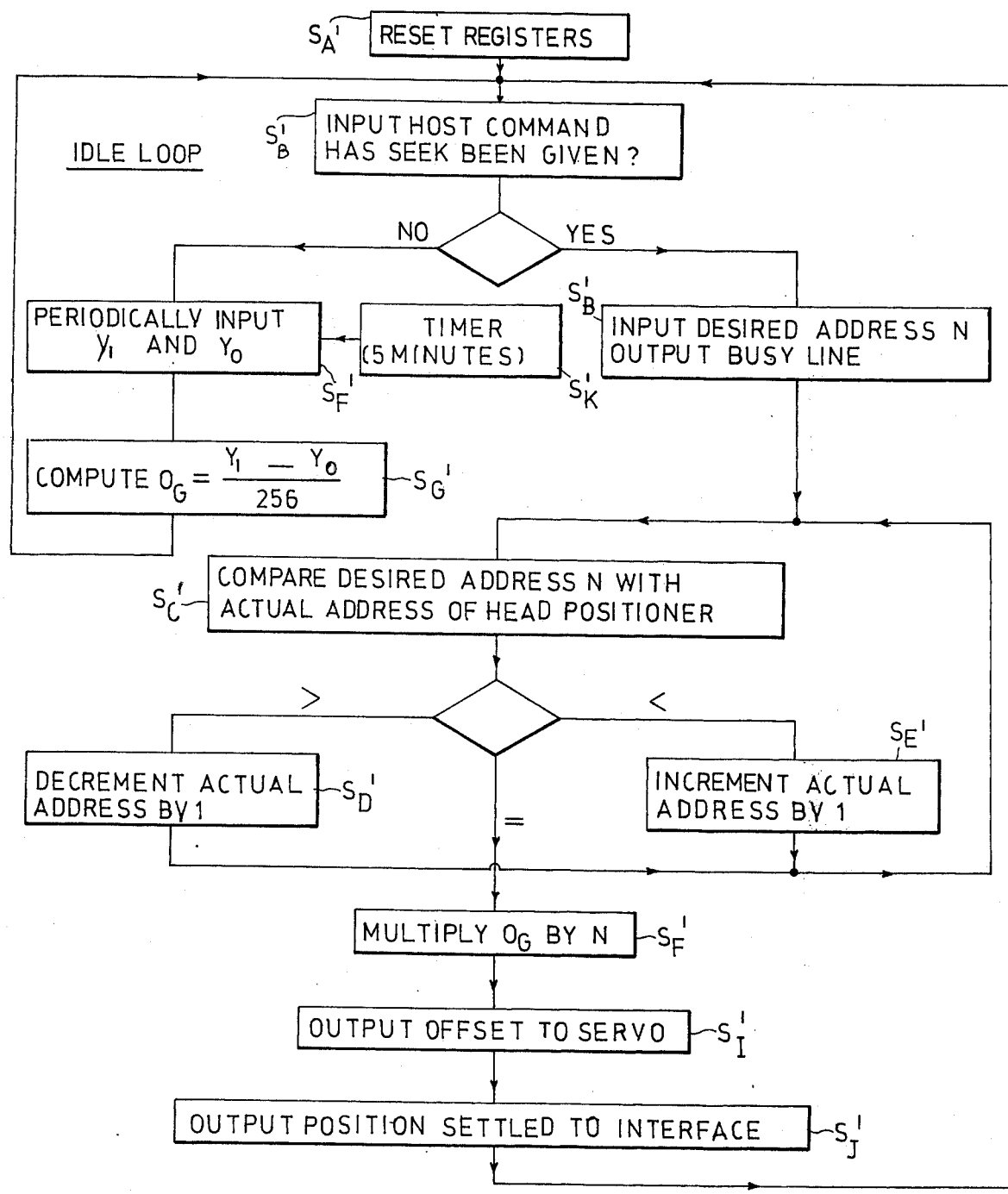
FIG. 10 is a flow diagram similar to that of FIG. 7 but illustrating another mode of operation of the microprocessor.

FIG. 10 is a state flow chart similar to that of FIG. 7 but illustrating a variation in the operation of the microprocessor. In the variation of FIG. 10, the states $S_F'$ and $S_G'$, corresponding to states $S_F$ and $S_G$ in FIG. 7, are removed from the main stream of calculations and are repositioned in an idle loop. Thus, the measured offsets $Y_1$ and $Y_0$ are inputted periodically (e.g. every 5 minutes) as defined by an idle timer $S_K'$. The computation of $O_G$ is also performed during the idle loop as shown by box $S_G'$ being in the idle loop. The remaining states in the flow chart of FIG. 10 correspond to those in FIG. 7 and carry the corresponding reference characters but include a "prime" mark. The main advantage in the operation illustrated in FIG. 10 is that it substantially decreases the access time over the operation illustrated in FIG. 7.

Whereas the above described embodiments measure the actual dimensional deviation or offset over a predetermined distance measured between the two servo tracks $X_0$ and $X_1$, the offset could be measured with respect to only one servo track ($X_1$) and a stored constant used in place of the other servo track ($X_0$).

Many other variations, applications, and implementations of the invention will be apparent to those skilled in the art.

What is claimed is:

1. A system for accurately positioning a device at various locations with respect to a reference on a body in accordance with a command position signal, despite temperature and humidity variations, comprising:
   measuring means for measuring the actual dimensional deviation of said body from its true dimension over a predetermined distance therealong and for producing a cumulative offset signal indicative of the cumulative deviation over said predetermined distance;
   computing means effective, upon the reception of a command position signal specifying a commanded displacement of said device for producing a corrected position signal specifying said commanded displacement corrected by the deviation of said cumulative offset signal prorated over the distance of said commanded displacement including means for computing from said cumulative offset signal a gradient offset signal corresponding to the linear variation of said cumulative offset signal over said predetermined distance;
   means effective, upon the reception of a command position signal specifying a commanded displacement to multiply same by said gradient offset signal and to add the product so obtained to the commanded displacement to produce said corrected position signal; and
   positioning means for positioning said device in accordance with said corrected position signal.

2. A system according to claim 1 wherein said measuring means periodically measures the actual dimensional deviation of the body from its true dimension over a predetermined distance thereof defined by two fixed reference points on the body, stores a value corresponding to said measurement, and utilizes said latter value for producing the corrected position signal upon the reception of the command position signal for correcting the position of the device.

3. A system according to claim 2 wherein said device to be positioned is a transducer, and said body is a plural track record disk having a pair of spaced recorded reference tracks constituting said two fixed reference points thereon.

4. A system according to claim 3 wherein said measuring means comprises:
   a first register including means for loading same with a value corresponding to the measured offset of the record disk from the true value at said first reference track;
   a second register including means for loading same with a value corresponding to the measured offset of the record disk from the true value at said second reference track;
   means for subtracting the contents of the first register from that of the second register to produce a value corresponding to the cumulative offset of the transducer over the distance between said first and second tracks; and
   means for reading out the contents of said second register to produce said cumulative offset signal.

5. A system for accurately positioning a device at various locations with respect to a reference on a body in accordance with a command position signal, despite temperature and humidity variations, comprising:
   measuring means for measuring the actual dimensional deviation of said body from its true dimension over a predetermined distance therealong and for producing a cumulative offset signal indicative of the cumulative deviation over said predetermined distance;
   computing means effective, upon the reception of a command position signal specifying a commanded displacement including means effective, upon the reception of a command position signal specifying a commanded displacement, to multiply same by said cumulative offset signal, to divide the product so obtained by said predetermined distance, and to add the quotient so obtained to the commanded displacement to produce a corrected position signal specifying said commanded displacement corrected by the deviation of said cumulative offset signal prorated over the distance of said commanded displacement; and
   positioning means for positioning said device in accordance with said corrected position signal.

6. A system according to claim 5 wherein said measuring means periodically measures the actual dimensional deviation of the body from its true dimension over a predetermined distance thereof defined by two fixed reference points on the body, stores a value corresponding to said measurement, and utilizes said latter value for producing the corrected position signal upon the reception of the command position signal for correcting the position of the device.

7. A system according to claim 6 wherein said device to be positioned is a transducer, and said body is a plural track record disk having a pair of spaced recorded reference tracks constituting said two fixed reference points thereon.

8. A system according to claim 7 wherein said measuring means comprises:
   a first register including means for loading same with a value corresponding to the measured offset of the record disk from the true value at said first reference track;

a second register including means for loading same with a value corresponding to the measured offset of the record disk from the true value at said second reference track;

means for subtracting the contents of the first register from that of the second register to produce a value corresponding to the cumulative offset of the transducer over the distance between said first and second tracks; and means for reading out the contents of said second register to produce said cumulative offset signal.

9. A method for accurately positioning a device with respect to a reference on a body in accordance with a command position signal, despite temperature and humidity variations, comprising the steps:

measuring the actual dimensional deviation of said body from its true dimension over a predetermined distance therealong and producing a cumulative offset signal indicative of the deviation over said predetermined distance upon the reception of a command position signal specifying a commanded displacement of the device, producing a corrected position signal specifying said commanded displacement corrected by said cumulative offset signal prorated over the distance of said commanded displacement by multiplying said commanded displacement by said cumulative offset signal, dividing the product so obtained by said predetermined distance and adding the quotient so obtained to the commanded displacement to produce said corrected position signal and positioning said device in accordance with said corrected position signal.

10. The method according to claim 9 wherein the actual dimensional deviation of said body from its true dimension over a predetermined distance is periodically measured, and a value representative of said measurement is stored, said latter value being utilized for producing said corrected position signal upon the reception of the command position signal for correcting the position of the device.

11. A method for accurately positioning a device with respect to a reference on a body in accordance with a command position signal, despite temperature and humidity variations, comprising the steps of:

measuring the actual dimensional deviation of said body from its true dimension over a predetermined distance therealong and producing a cumulative offset signal indicative of the deviation over said predetermined distance; upon the reception of a command position signal specifying a commanded displacement of the device, producing a corrected position signal specifying said commanded displacement corrected by said cumulative offset signal prorated over the distance of said commanded displacement by computing from said cumulative offset signal a gradient offset signal corresponding to the linear variation of said cumulative offset signal over said predetermined distance and upon reception of said commanded displacement signal multiplying the same by said gradient offset signal and adding the product so obtained to the commanded displacement signal to produce siad corrected position signal; and positioning said device in accordance with said corrected position signal.

12. The method according to claim 11 wherein the actual dimensional deviation of said body from its true dimension over a predetermined distance is periodically measured, and a value representative of said measurement is stored, said latter value being utilized for producing said corrected position signal upon the reception of the command position signal for correcting the position of the device.

* * * * *